April 28, 1959 J. G. KRENZKE 2,884,026
MEAT AND BONE SAW
Filed Nov. 30, 1956 5 Sheets-Sheet 1
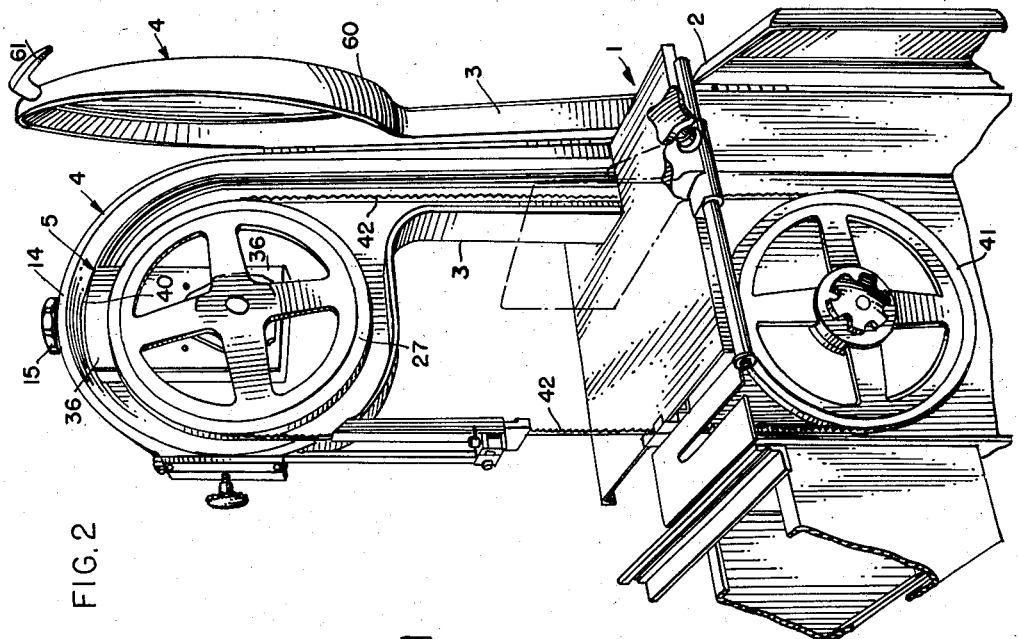
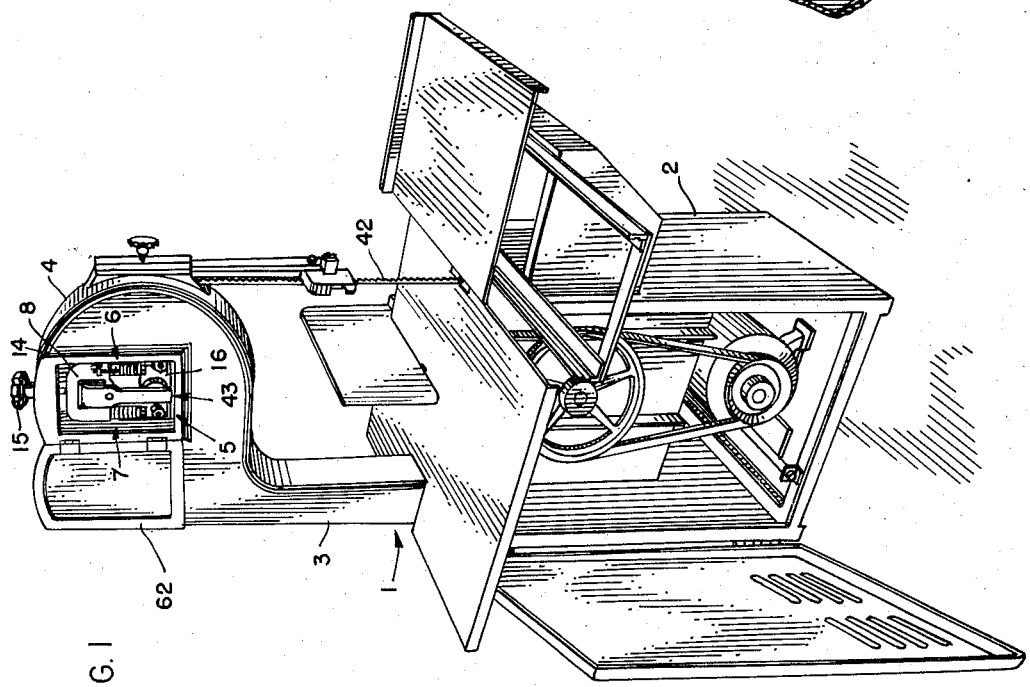
*INVENTOR:*
JOHN G. KRENZKE
BY
*Marzall, Johnston, Cook & Root*
ATT'YS April 28, 1959  J. G. KRENZKE  2,884,026
MEAT AND BONE SAW
Filed Nov. 30, 1956  5 Sheets-Sheet 2

INVENTOR:
JOHN G. KRENZKE
BY Marzall, Johnston, Cook & Root
ATT'YS

April 28, 1959  J. G. KRENZKE  2,884,026
MEAT AND BONE SAW

Filed Nov. 30, 1956  5 Sheets-Sheet 3

INVENTOR:
JOHN G. KRENZKE
BY
Margall, Johnston, Cook + Root.
ATT'YS

April 28, 1959  J. G. KRENZKE  2,884,026
MEAT AND BONE SAW
Filed Nov. 30, 1956  5 Sheets-Sheet 4

INVENTOR:
JOHN G. KRENZKE
BY
Mangall, Johnston, Cook & Root.
ATT'YS

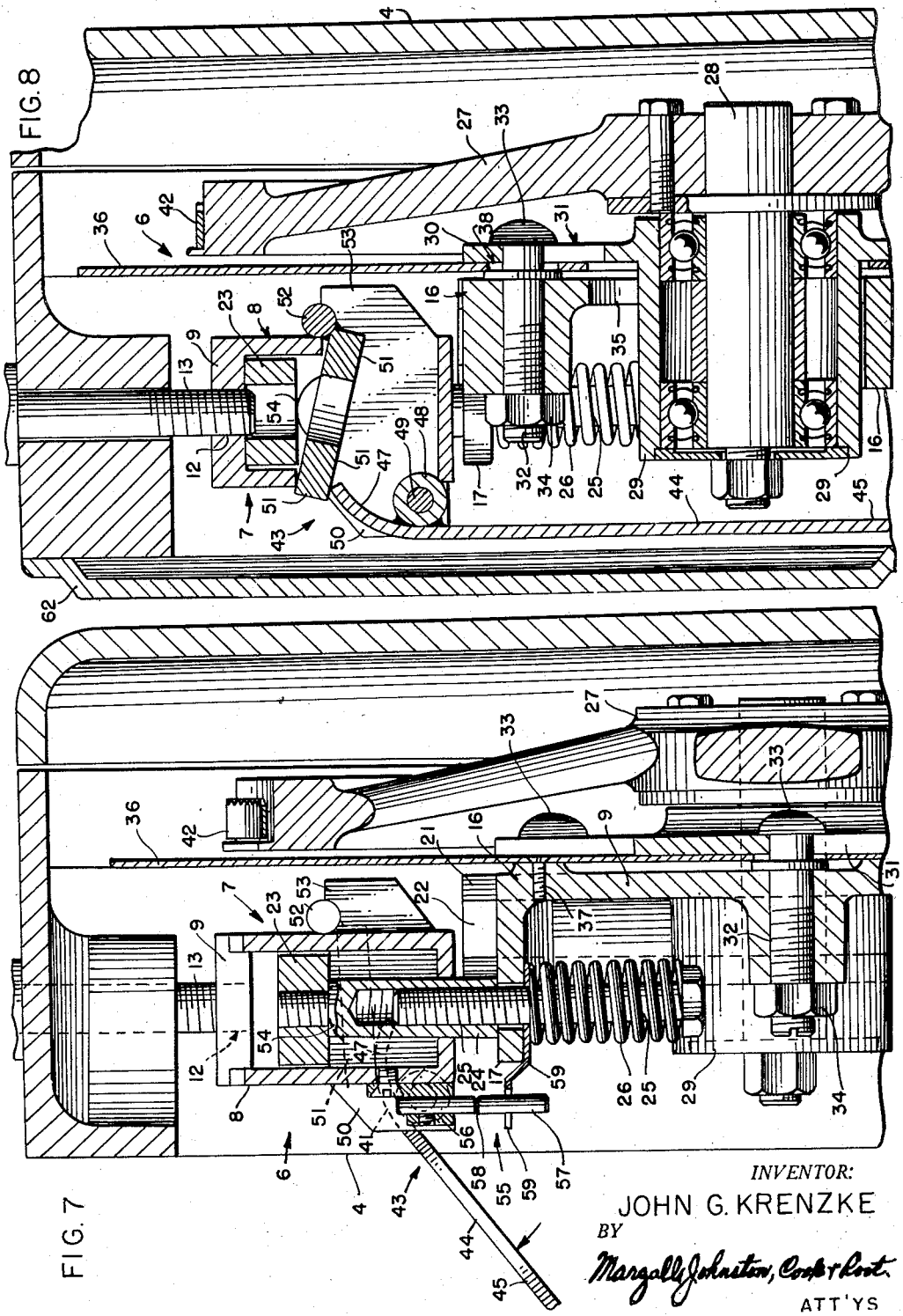

United States Patent Office 2,884,026
Patented Apr. 28, 1959

2,884,026

MEAT AND BONE SAW

John G. Krenzke, La Porte, Ind., assignor to U.S. Slicing Machine Company, Inc., La Porte, Ind., a corporation of Indiana Application November 30, 1956, Serial No. 625,408

3 Claims. (Cl. 143—27)

This invention relates in general to a meat and bone saw of the type disclosed in United States Letters Patent No. 2,492,824, issued December 27, 1949 to A. H. Ahrndt et al. More specifically, the invention relates to a saw tensioning device of the general type shown particularly in Figs. 8 and 9 of said Letters Patent.

The saw tensioning device of the present invention is an improvement over the tensioning device shown in said patent, and embodies a cam lever for quickly tensioning the endless saw blade in one single manual operation by the mere shifting of a pivotally mounted lever, whereby an upper driven saw pulley is raised, or lowered, against the tension of coil springs, to effect proper tension of the endless saw blade. The upper saw pulley is mounted on, and carried by, a lower slide block which comprises one of several cooperating elements or components of a fixture. The fixture, including all its cooperating elements or component parts of the saw tensioning device, is adjusted or shifted vertically to a substantially predetermined position by means of a hand wheel having a threaded stem threadedly engaging another component or upper head of the fixture. The bodily shifting of the fixture bodily shifts the upper driven pulley, the upper pulley being mounted in bearings journalled in the lower slide block of the fixture, creating a tension on the endless saw. The entire fixture, and its supported pulley, is adjustably shifted vertically by rotating a hand wheel.

The lower slide block part of the fixture is adjusted vertically with respect to the upper head part by operation of the cam lever. Pre-tensioned coiled compression springs are arranged between the head and the slide to effect a cushion for resiliently mounting and supporting the shaft of the pulley. These coiled tension springs are supported from the head by elements, such as rods or bolts. The coil springs have their tops engaging a flange on the slide block at the upper end thereof. The cam lever, when operated, raises the slide block with respect to the head, and inasmuch as the bearing for the pulley is journalled on the slide block, the slide block and the pulley are raised to apply tension to the endless saw. The operation of the hand wheel raises the entire fixture, also the pulley. The cam lever, upon being lowered, normally completes the raising of the lower slide and its associated pulley to apply the necessary and proper tension on the endless saw. However, should too much, or not enough, tension be on the saw, the hand wheel may be operated to effect a fine and completed adjustment.

The primary object of the present invention is to provide a new and improved tensioning device for resiliently mounting the upper driven pulley over which an endless saw is mounted, the pulley being resiliently mounted and supported by an operable fixture, there being cam lever means provided for effecting quick operation of the head of the fixture with respect to a cooperating slide block, so that proper tension may be applied easily and quickly to the endless saw, by the mere shifting of a cam lever.

Another important object of the invention resides in the provision of a lever, provided with a cam at its upper end, to effect speedy adjustment of one part of the tensioning device with respect to another, so that the endless saw may be easily and readily applied over the saw pulleys, and later provided with the proper tension by the simple operation of the shiftable movement of a single lever.

A further object of the invention lies in a unique arrangement for shifting one part of the tensioning device with respect to another, by the mere shifting of a cam lever, there being screw means for effecting vertical adjustment of the entire fixture for pre-setting the fixture, and for effecting fine adjustment of one part of the fixture with respect to the other, whereby the entire fixture is capable of adjustment; and one part of the fixture is adjustable with respect to its cooperating part to bring the endless saw to proper tension by the operation of a hand controlled lever.

A still further object is the provision of a new and improved tensioning device which supports an upper saw pulley having a plate secured thereto for removable attachment to the saw tensioning device, there being lever means and screw means for effecting first near adjustment and then fine adjustment to permit the tension on the saw to be increased or decreased.

Numerous other objects and advantages will be apparent throughout the progress of the specification, which is to follow.

The accompanying drawings discloses a certain selected embodiment of the invention, and the views therein are as follows:

Fig. 1 is a detail perspective view showing the front and left-hand side of a meat and bone saw and embodying the invention;

Fig. 2 is an enlarged detail perspective view showing the right-hand side and a part of the front side of the saw;

Fig. 7 is an enlarged detail vertical sectional view, similar to Fig. 5, showing the cam lever in raised position, the pulley being in lowered position for relaxing saw tension; and Fig. 8 is an enlarged detail vertical sectional view on the line 8—8 of Fig. 3, the view showing the cam lever handle in normal lowered position for tensioning the saw.

Figure 3:
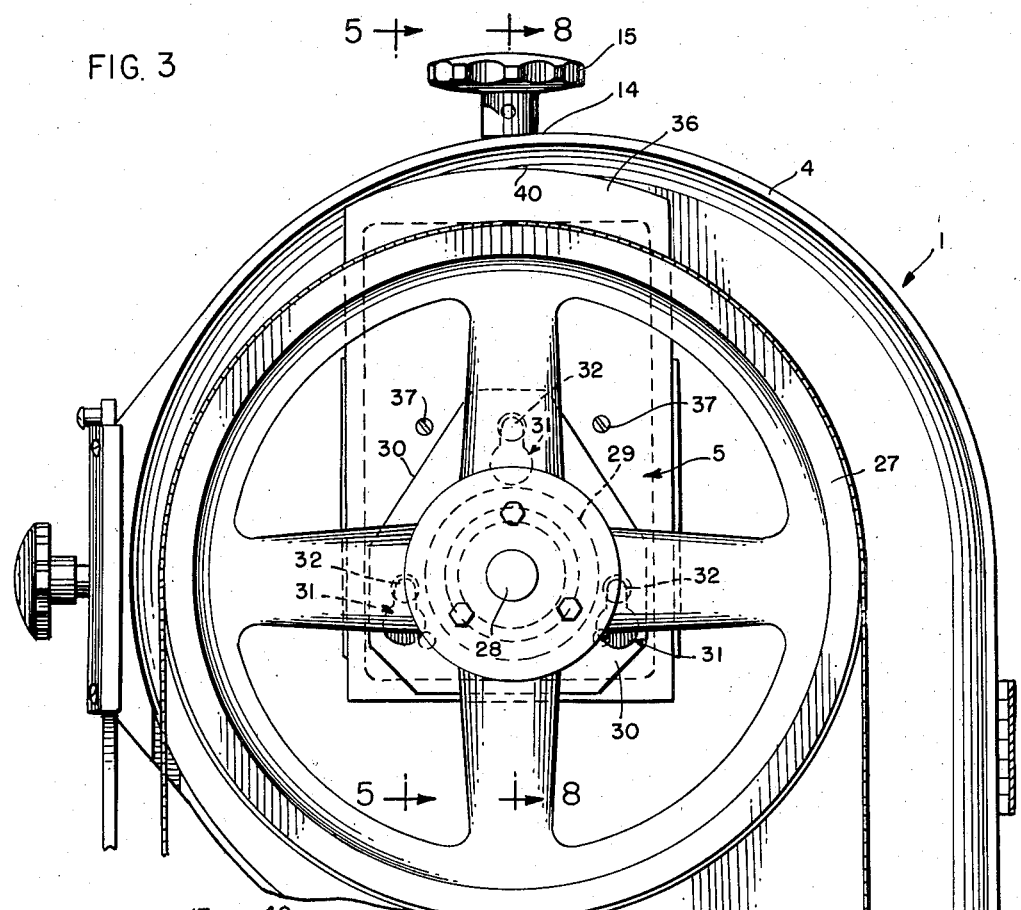
Fig. 3 is an enlarged detail elevational view of the rear or right-hand side of the machine head, the front closure door being omitted.

The tensioning device shown herein for the purpose of illustrating the invention is applied to a meat and bone saw manufactured by the U.S. Slicing Machine Company, Inc., of La Porte, Indiana.

The meat and bone saw herein shown comprises a machine frame 1 including a lower base section in the form of a lower cabinet 2, Figs. 1 and 2. An upstanding vertical column 3, Figs. 1, 2 and 3, extends upwardly from the top of the cabinet 2, and terminates in an upper housing 4 which may be formed integrally along with the vertical column 3. The column 3, and its associated housing 4, may be formed of sheet metal, or the parts may be cast in one unit as shown. The housing 4 is provided with an opening 5 extending through an inner wall of the housing 4 through which certain parts of a saw tensioning device 6 of the invention are arranged.

Figure 5:
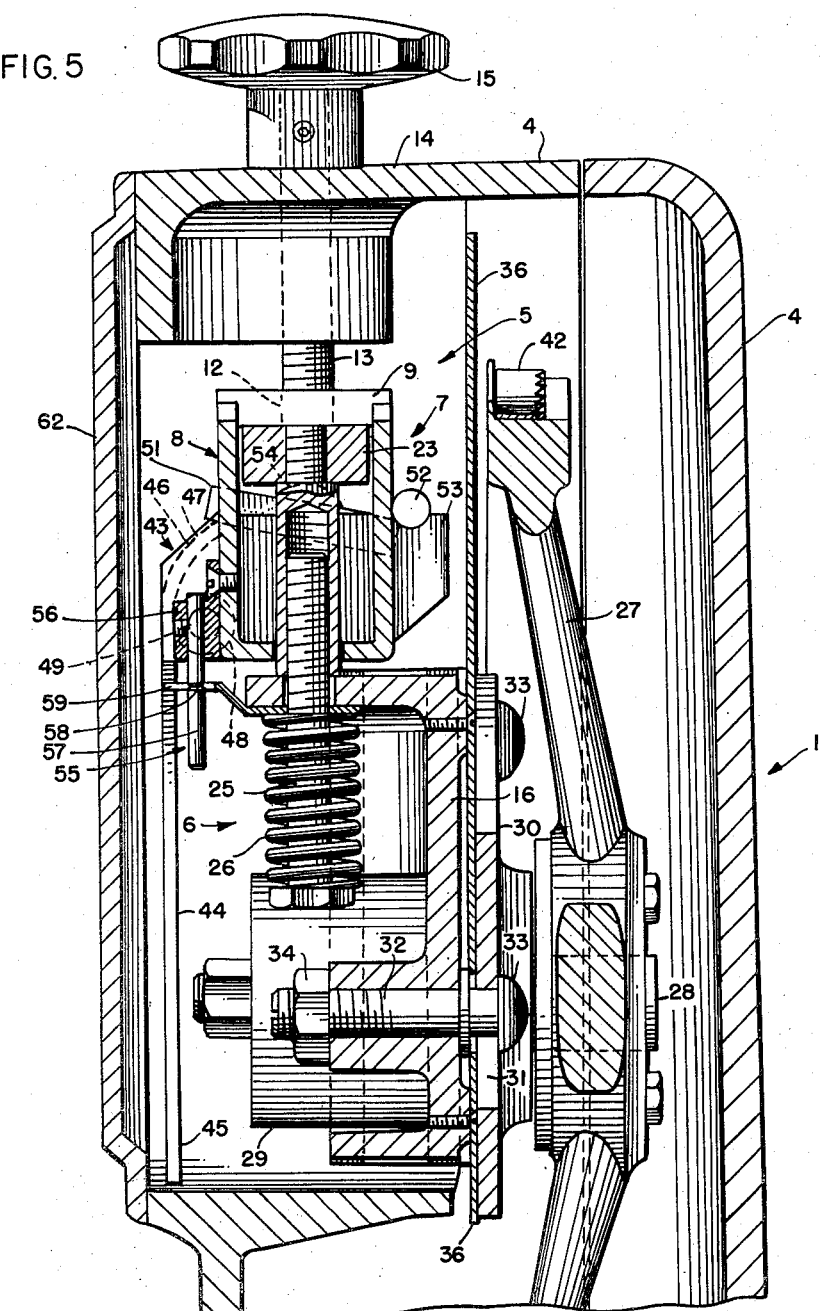
Fig. 5 is an enlarged detail sectional view on the line 5—5 of Fig. 3, the cam lever being in its normal operating lowered position.
Figure 6:
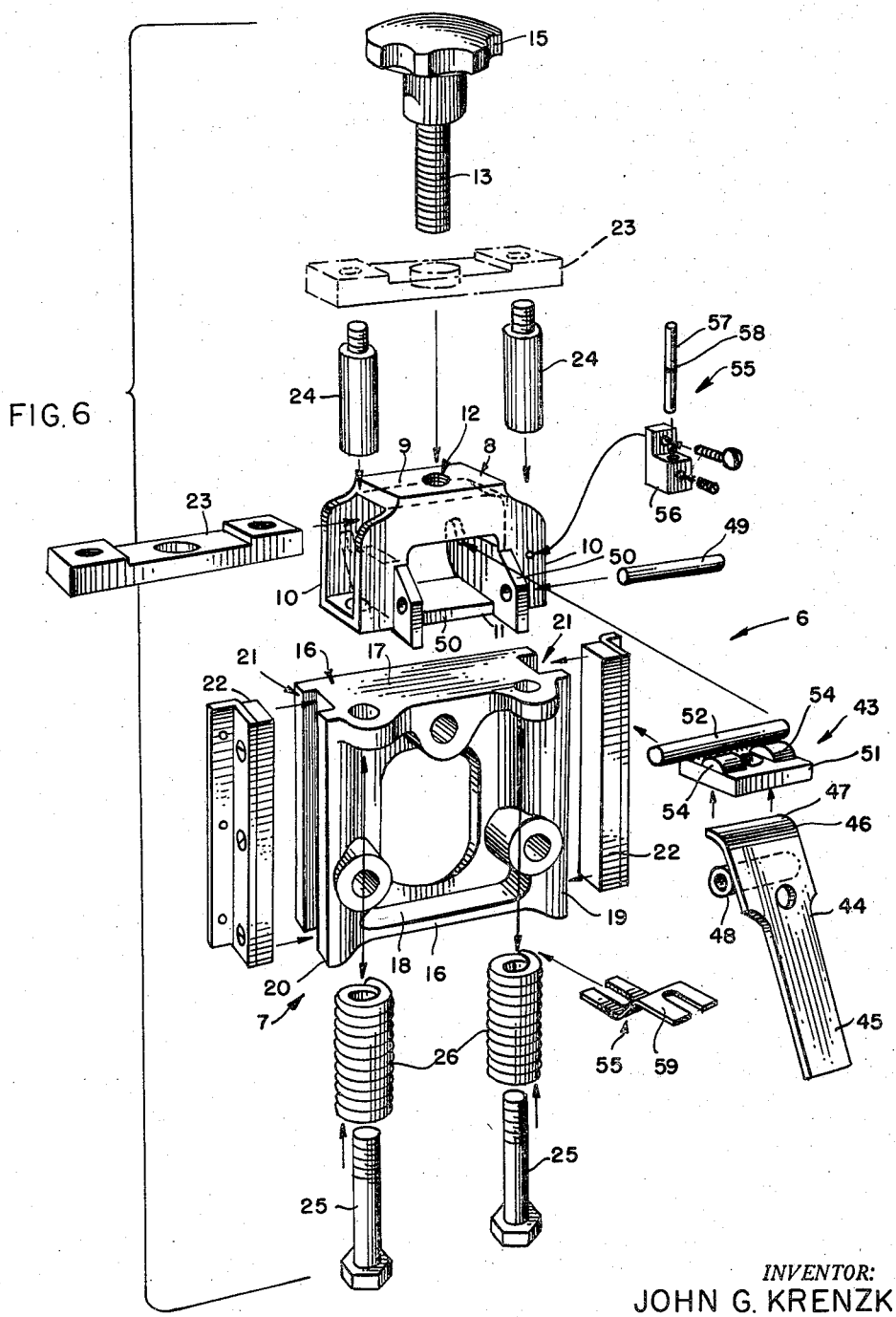
Fig. 6 is an enlarged detail exploded view, showing the parts constituting the fixture of the tensioning device in perspective.

The saw tensioning device 6 comprises a fixture 7, Fig. 6, comprising several components including an upper head 8 which is relatively horseshoe shaped. The head 8 has a top part 9 from which spaced legs 10 project downwardly, the bottom of the legs 10 being connected by a bottom horizontal section or bar 11. The head 8, of the fixture 7, is provided with a threaded opening 12 in the top 9, the opening 12 being adapted to receive a threaded screw 13. The threaded screw 13 extends through a boss below the upper, or top part 14 of the housing 4, Figs. 3 and 5, there being a hand wheel 15 secured to the upper part of the threaded screw 13, whereby rotation of the hand wheel 15 will cause the entire fixture 7 to be translated vertically, upwardly and downwardly.

A lower rectangularly shaped slide block or member 16, Figs. 4 to 8, is arranged immediately below the head 8 and operatively in alinement therewith. The lower slide block 16 is preferably cast as a single unit, but it may, if desirable or practicable, be formed of sheet metal. This lower slide block 16, Figs. 4 and 6, comprises a top 17, a bottom 18 and sides 19 and 20. The sides 20 are grooved vertically throughout their entire length to form guideways 21 which are adapted to engage slide guide bars 22, Fig. 6, which are fixed to a part of the housing wall by angle brackets so that the slide 16 is slidably mounted in the housing 4.

A cross head 23, Figs. 5 to 8, is arranged immediately below the under side of the top 9 of the head 8 and extends through a transverse opening provided through the legs 10 of the head 8. Threaded hollow sleeves or rods 24, one arranged at each side of the legs 10, have their upper ends screwed into the bottom of the cross head 23, and their lower ends arranged at the top 17 of the slide 16, Figs. 5 and 7. The slide block 16 is thus suspended from the head 8; and inasmuch as the head 8 is supported on the housing 4 by the screw 13, the entire fixture 7 is suspended from the machine housing top 14 of the housing 4. Bolts 25 are threaded into the rods or sleeves 24 and extend downwardly from the top of the slide block 16, Figs. 5 and 7.

Pre-tensioned coil compression springs 26, Figs. 5 and 6, surround the bolts 25, the bottoms of the springs engaging the heads of the bolts, while the upper ends of the springs bear against the lower side of the top 17 of the slide block 16.

The entire fixture 7 is slidably mounted on the housing 4, the fixture being properly guided vertically by the grooves or guideways 21 engaging the guide bars 22 which are fixed to the housing 4, Fig. 6. The entire fixture 7, therefore, is vertically slidable by operation of the hand wheel 15 being guided by means of the guide bars 22 engaging the grooves or guideways 21. Also, the head 8 is provided with independent vertical movement with respect to the slide block 16 as the head 8 is slidably mounted on the threaded rods or sleeves 24, the vertical slidable movement of the head 8, with respect to the slide 16, being determined by the length of the threaded rods 24. In the embodiment herein shown, the threaded rods or sleeves 24 are of sufficient length to permit some relative vertical movement between the head 8 and the slide 16, Figs. 7 and 8. The vertical slidable movement of the head 8, with respect to the slide block 16, is limited by the size of the opening on each side of the head 8 below the top 9 through openings in which the cross head 23 extends, and the bottom of the head 8 with respect to the top of the slide block 16. The bolts 25 may be threaded directly into the bottom of the internally threaded rods or sleeves 24, as shown in Figs. 5, 7 and 8. In any event, the bottom slide block 16 is suspended from the head 8 by having the top 17 of the slide block 16 resting on the top of the loaded coil springs 26, whereby a resilient mounting is provided for the bottom slide block 16.

The bottom slide block 16 supports an upper pulley 27 and is demountably fastened to the rear face of the slide block 16, Figs. 3 to 5 and 7 to 8. The upper pulley 27 is mounted on a pulley shaft 28, Fig. 8, which is journalled in suitable bearings arranged in a bearing sleeve 29, Figs. 5, 7 and 8.

Figure 4:
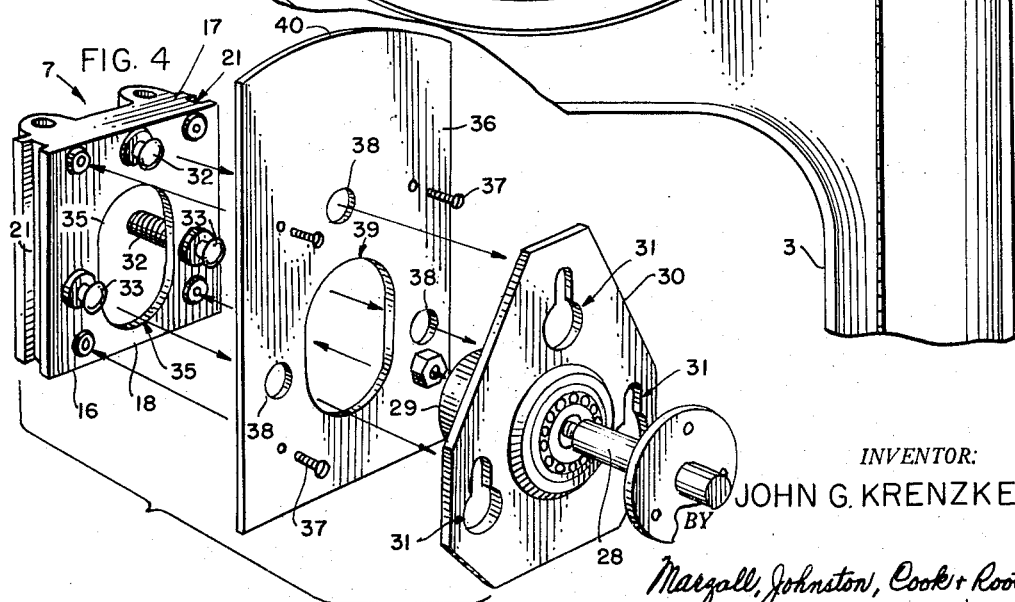
Fig. 4 is an enlarged detail exploded view, showing certain parts of Fig. 3 in perspective.

The bearing sleeve 29, Figs. 3 and 4, has connected thereto an attaching plate 30, the sleeve 29 and the plate 30 being preferably cast as a single unit. The attaching plate 30 is of the shape disclosed in Figs. 3 and 4, and is provided with reversely arranged keyhole openings or slots 31 which are adapted to receive studs 32 having heads 33. The studs 32 are screw threaded completely through the lower slide block 16 and are locked in position on the front side of the slide block 16 by means of nuts 34, Figs. 5, 7 and 8. The heads 33 of the studs 32 are arranged on the rear side of the slide block 16, over which studs the attaching plate 30 is mounted. The larger part of each keyhole slot or opening 31 receives the heads 33 of the studs 32, whereupon the narrow elongated section of the slots or openings 31 will engage the stems of the studs 32 immediately beneath their heads 33. The studs 32 hold the pulley 27 in puroper position, the adjustment plate 30 being easily applied by inserting the slots or openings 31 in the attaching plate 30 under the heads 33 of the studs 32. The pulley 27, the attaching plate 30, and its cooperating bearing sleeve 29, therefore, are hung on the slide block 16 with the bearing sleeve 29 extending forwardly through an elongated opening 35, Figs. 4 and 8, formed in the rear face of the slide block 16.

A cover or closure plate 36, Figs. 3, 4, 5, 7 and 8, is interposed between the rear face of the slide block 16 and the inner face of the attaching plate 30, being held in position by screws 37, Figs. 3 and 4, which secure the plate 36 directly to the outer or rear face of the slide block 16. This plate 36 is also provided with openings 38 to permit the plate to be applied over the studs 32, Fig. 4. The plate 36 is provided also with an elongated opening 39 through which the bearing sleeve 29 is free to pass, the elongated opening 39 being substantially in alinement with the elongated opening 35 in the rear face of the slide block 16. This closure plate 36 closes the rear side of the opening 5 in the housing 4, the plate 36 being rounded at its upper end, as indicated at 40, Figs. 3 and 4, to conform with the rounded surface beneath the top 14 of the housing 4. The pulley 27, therefore, is adapted to be mounted on the slide block 16 merely by hanging the attaching plate 30 onto the studs 32. The pulley 27 is resiliently mounted because the weight of the pulley and the slide block 16 is supported on the pre-loaded coil springs 26. The tension or the compression of the springs 26 may be varied by turning the bolts 25 to effect greater or less tension or compression on the coil springs 26, depending upon which direction the bolts 25 are turned.

The entire fixture 7 is subject to vertical movement by the mere turning of the hand wheel 15 which turns the screw 13 to raise or lower the entire fixture, as conditions demand or require. Therefore, when the hand wheel 15 is operated, the pulley 27 is adapted to be raised or lowered because the operation of this hand wheel will raise or lower the entire fixture 7.

A second pulley 41, Fig. 2, is located in the lower base or cabinet part 2 of the machine, and this pulley 41 is in direct vertical alinement with the upper pulley 27. The lower pulley 41 is mounted in suitable bearings journalled in a part of the machine frame and is driven by an electric motor, Fig. 1. An endless saw 42 is trained over the pulleys 27 and 41, the lower pulley 41 being driven by the motor, and the upper pulley being driven by the traction of the endless saw 42, Fig. 2.

For the purpose of creating the proper tension on the band saw 42 by one quick movement, the lower slide 16 of the fixture 7 is adapted to be shifted with respect to the upper head 8. For the purpose of effecting this vertical adjustment of the slide 16 with respect to the head 8, quick operating means 43 are provided.

The quick operating means 43, Figs. 5 to 8, comprise an elongated lever 44 which comprises an elongated hand lever part or handle 45 which is arcuated at its upper end, as indicated at 46, to provide a cam surface 47. The lever 44 is provided with an enlargement 48 immediately below the cam surface 47. The enlargement 48 is provided with a horizontal circular opening extending therethrough into which a pin 49 is supported at its outer ends by means of ears or projections 50 which extend outwardly from the front face of the head 8, the member 50 being integrally formed on each of the legs 10 as clearly shown in Fig. 6. The cam lever 44 is pivotally mounted on the head 8 by being mounted on the pin 49 which is supported by the ears 50. The cam end 47 of the cam lever 44 is adapted to engage the under flat side of a pivotally mounted member 51, Figs. 5 to 8, which is pivotally, but removably, mounted on the head 8, being arranged immediately below the cross head 23. This member 51 is arranged below the top 9 of the head 8 as well as immediately below the cross head 23.

The rear end of this member 51, Figs. 5 to 8, is provided with an elongated bearing pin 52, the pin 52 being fixed to the member 51 and supported in spaced ears 53 integrally connected to the rear side or face of the head 8. The upper surface of the pivotally mounted member 51 is provided with spaced, rounded protuberances or projections 54 to form cams which are adapted to engage the under side of the cross head 23. Therefore, inasmuch as the head 8 is supported to the housing 4 and hung therefrom, the cam lever 44, when operated, will cause vertical movement of the cross head 23. As the cross head 23 is fastened to the lower slide block 16 by means of the threaded rods or sleeves 24 and the bolts 25, movement of the cam lever 44 will cause vertical movement of the slide block 16. Operation of the cam lever 44 to a horizontal or angular position as shown in Fig. 7, will have no effect in shifting the lower slide block 16, because the upper head 8 will be in its downward position and not be affected by the springs 26. Therefore, when the lever 44 is in the position shown in Fig. 6, or in a higher position, there will be no effect in shifting the lower slide block 16, the cam end 47 of the lever not controlling the operation of the pivotally mounted member 51 at that time. However, when the lever 44 is moved downwardly, the upper end of the lever 44 will contact and engage the pivotally mounted member 51 and cause the member 51 to be swung upwardly, as shown in Fig. 8, whereupon the head 8 will be caused to move upwardly and carry the slide block 16 upwardly, which, in turn, moves the pulley 27 to move upwardly and to create a tension on the endless saw blade 42, when the cam lever is moved downwardly, the cam surface or cam end 47 on the lever 44 will cause the cam surface 47 to engage the pivotally mounted member 51, swing that member about its pivot pin 52, and cause the rounded projections or cams 54 on the pivotally mounted member 51 to engage the cross head 23 and move the cross head 23 upwardly, with the result that the cross head 23 will pull the lower slide block 16 upwardly. This upward movement will cause corresponding upward movement of the upper pulley 27, and thus spread the upper pulley 27 farther away from the lower pulley 41, consequently causing tightening of the endless saw 42.

The rotation of the hand wheel 15 causes vertical translation of the entire fixture 7. Therefore, this hand wheel may be used to effect a certain amount of vertical movement of the upper saw pulley 27. Operation of the cam lever 44 will cause vertical slidable movement of the lower cross head 16. Therefore, vertical adjustment of the upper pulley 27 may be had by either operating the hand wheel 15 or by operating the lever 44.

In operation it has been found practical to first raise the cam lever 44 so that the upper pulley 27 will be in its lowered position and the saw 42 will be slack or loose, Fig. 7. The endless saw 42, therefore, may be easily trained over the pulleys 27 and 41. The hand wheel 15 may then be operated to raise the entire fixture 7 a slight amount so as to create some, however slight, tension on the saw 42. The lower shifting of the cam lever 44 will then raise the lower slide block 16 upwardly a predetermined amount because of the operation of the cam 47 with respect to the cross head 23, which is effected through the intermediary of the pivotally mounted member 51. When the handle 45 is in its lowermost position, Figs. 5 and 8, then the endless saw 42 is given substantially the proper amount of tension required or desired. However, by the use of a meter it can be determined whether or not there is too much, or too little, tension on the band saw 42, it being desirable that a certain predetermined amount of tension be applied to the band saw for the proper cutting operation whether the substance to be cut is for meat, bone or fish.

In the event there is too much tension after the cam lever 44 is at its lowermost position, the hand wheel 15 is operated to release or relieve some of the tension so that the proper tension will be had. Should, however, there be an insufficient amount of tension on the endless saw 42, the hand wheel 15 is rotated in an opposite direction to provide additional tension so that the exact proper tension may be had. After this setting has once been accomplished, the endless saw 42 may be easily slipped off its pulleys 27 and 41 by raising the handle 45, Fig. 7; and when the band saw 42 is to be replaced, after cleaning or the like, the handle 45 of the cam lever 44 is again pushed down to its lowermost position whereby the exact amount of tension is again placed on the saw, Figs. 5 and 8. Therefore, the saw may be taken off and replaced at will, for cleaning, repair or for any other purpose, by merely first flipping the handle upwardly, Fig. 7, to take all tension off the band saw 42 to permit easy removal, and then when the saw is again applied over the pulleys 27 and 41, the saw is given its proper tension by merely pushing the handle 45 down to its lowermost position, Figs. 5 and 8.

The construction and operation of the cam lever 44 is such that when the hand lever is lowered to its lowermost operating position, as shown in Figs. 5 and 8, it will remain in its locked position because the curved surface 46 acts in the nature of a toggle for maintaining the cam lever 44, and consequently the slide block 16 in normal operative position, as shown in Figs. 5 and 8.

Indicating means 55 is provided to indicate the proper tension of the saw, and is for the same purpose as the members 44—46 as shown particularly in Fig. 8 of the aforesaid Ahrndt et al. Patent No. 2,492,824. The indicating means 55, Figs. 5 to 7, comprises a block 56 which is secured to the head 8 and carries an elongated vertical rod 57 having an indication mark 58. A clip 59, acting as a pointer indication and cooperating with the mark 58, is secured beneath the top 17 of the slide block 16 and the upper ends of a spring 26.

The vertical column 3 of the machine frame, and including the head or housing 4 thereof, is divided vertically and forms a door 60 which is hinged to its adjacent part, being locked in closed position by means of a locking device 61, Fig. 2. The front of the housing 4, which has the opening 5 into which the tensioning device is arranged, is closed by a hinged door 62, Figs. 1 and 5, there being appropriate locking means for locking the door in its closed position.

The invention, therefore, provides a very simple device which resiliently supports the upper saw pulley as well as providing the correct adjustment of the upper pulley to effect the proper tension on the saw. This adjustment is done, as previously stated, by effecting vertical shiftable movement of the entire fixture 7 by the manipulation of the hand wheel 15 or by the manipulation of the cam lever 44. Also, the unique manner in which the pulley 27 is mounted on the lower slide block 16 permits for quick and easy removal of the upper pulley 27.

The upper pulley 27 may be easily applied or removed, and the saw 42 may be easily and quickly applied or removed. The saw 42 may be instantly provided with the proper adjustment by the mere operation of a single handle. The parts comprising the entire saw tensioning device 6 are composed of a few and simple parts which may be quickly and readily assembled, and being strong and durable in construction, are not likely to become out of alinement. Furthermore, the entire fixture 7 is adapted to be mounted quickly and easily in the housing 4 at the upper end of the machine.

Changes may be made in the form and construction of the parts without departing from the spirit of the invention or sacrificing any of its attendant advantages, and the right is hereby reserved to make such changes as may fall fairly within the scope of the following claims.

The invention is hereby claimed as follows:

1. A device for providing a tension on an endless saw trained over vertically spaced apart pulleys comprising a fixture, said fixture comprising a head, bolts supported by said head and extending downwardly therefrom, springs arranged about said bolts, a slide block resting on said springs whereby said slide block is resiliently mounted with respect to said head, means for mounting the upper pulley to said slide block, screw means engaging the head and shifting the entire fixture when the screw means is operated, a cross head carried by the head, means connecting the cross head and the slide block, a pivotally mounted member beneath the cross head and pivoted to said head, cam means on the pivotally mounted member and engageable with the cross head, a lever pivoted to said head, a cam on said lever and engaging the pivotally mounter member whereby shifting of the lever will shift the slide block with respect to the head and consequently shift the upper pulley to apply tension on the saw.

2. A device for providing a tension on an endless saw trained over vertically spaced apart pulleys comprising a fixture, said fixture comprising a head, bolts supported by said head and extending downwardly therefrom, springs arranged about said bolts, a slide block resting on said springs whereby said slide block is resiliently mounted with respect to said head, means for mounting the upper pulley to said slide block, screw means engaging the head and shifting the entire fixture when the screw means is operated, a cross head carried by the head, means connecting the cross head and the slide block, a pivotally mounted member beneath the cross head and pivoted to said head, cam means on the pivotally mounted member and engageable with the cross head, a lever pivoted to said head, a cam on said lever and engaging the pivotally mounted member whereby shifting of the lever will shift the slide block with respect to the head and consequently shift the upper pulley to apply tension on the saw, and a tension indicating member secured to the head and cooperating with a pointer indicating member arrangement between said springs and a part of the slide block.

3. A device for providing a tension on an endless saw trimmed over vertically spaced apart pulleys comprising a fixture, said fixture comprising a head, bolts supported by said head and extending downwardly therefrom, springs arranged about said bolts, a slide block resting on said springs whereby said slide block is resiliently mounted with respect to said head, means for mounting the upper pulley to said slide block, screw means engaging the head and shifting the entire fixture when the screw means is operated, a cross head carried by the head, means connecting the cross head to the slide block, a pivotally mounted member beneath the cross head and pivoted to said head, cam means on the pivotally mounted member and engageable with the cross head, a lever pivoted to said head, a cam on said lever and engaging the pivotally mounted member whereby shifting of the lever will shift the slide block with respect to the head and consequently shift the upper pulley to apply tension on the saw, said means for mounting the upper pulley to the slide block comprising a shaft for the pulley, a bearing member in which the shaft is journalled, a plate carrying the bearing, headed spaced studs carried by the slide block, said plate being provided with spaced openings which receive the headed studs, said openings in said plate each being in the form of inverted keyhole slots being relatively circular terminating into elongations, whereby the circular parts of the slots may be slipped over the studs and the plate then receiving the elongations of the slots whereby the upper pulley may be quickly and readily applied or removed from said studs.

References Cited in the file of this patent
UNITED STATES PATENTS

| | | |
|---|---|---|
| 762,095 | Seymour | June 7, 1904 |
| 1,967,724 | Ponton | July 24, 1934 |
| 2,101,343 | Ponton | Dec. 7, 1937 |
| 2,246,457 | Schultz | June 17, 1941 |
| 2,492,824 | Ahrndt et al. | Dec. 27, 1949 |
| 2,664,118 | Krumbach | Dec. 29, 1953 |